United States Patent [19]

Umezawa

[11] Patent Number: 5,437,483
[45] Date of Patent: Aug. 1, 1995

[54] FLEXIBLE HOSE JOINT

[75] Inventor: Katsushi Umezawa, Numazu, Japan

[73] Assignee: Usui Kokusai Sangyo Kaisha Ltd., Japan

[21] Appl. No.: 109,389

[22] Filed: Aug. 19, 1993

[30] Foreign Application Priority Data

Aug. 26, 1992 [JP] Japan .................. 4-250744

[51] Int. Cl.6 .................. F16L 37/18; F16L 19/08
[52] U.S. Cl. ...................... 285/308; 285/81; 285/316; 285/322; 285/340
[58] Field of Search ............. 285/322, 334.2, 340, 285/341, 242, 243, 308, 342, 318, 317, 316, 81

[56] References Cited

U.S. PATENT DOCUMENTS

| | | | |
|---|---|---|---|
| 2,177,184 | 10/1939 | Martin et al. | 285/342 X |
| 2,437,632 | 3/1948 | Wolfram | 285/342 |
| 2,511,134 | 6/1950 | Stranberg | 285/342 |
| 2,532,669 | 12/1950 | Jones | 285/354 X |
| 3,265,412 | 8/1966 | Reid et al. | 285/342 |
| 4,303,263 | 12/1981 | Legris | 285/323 X |
| 4,305,606 | 12/1981 | Legris | 285/323 X |
| 4,431,216 | 2/1984 | Legris | 285/323 X |
| 4,500,117 | 2/1985 | Ayers et al. | 285/323 X |
| 4,637,636 | 1/1987 | Guest | 285/323 X |
| 4,738,636 | 4/1988 | Bolante | 285/342 X |
| 4,895,395 | 1/1990 | Ceriani | 285/340 |
| 4,993,755 | 2/1991 | Johnston | 285/340 X |
| 5,171,045 | 12/1992 | Pasbrig | 285/322 X |

Primary Examiner—Dave W. Arola
Assistant Examiner—Heather Chun Shackelford
Attorney, Agent, or Firm—Anthony J. Casella; Gerald E. Hespos

[57] ABSTRACT

An improved joint for coupling flexible hoses for forming an air or oil supply system for an automobile or outdoor machines and equipment. The joint is provided with hose clamp means such as a collet which bites the outer peripheral surface of the top end of the hose inserted into the joint and a cover member for controlling the movement of the hose and at the same time, it is provided with several means for sealing the hose with respect to the joint so that the entry of water into the joint can be completely prevented and the corrosion of the joint elements and the hose within the joint can be eliminated to thereby keeping the sealing property of the joint for a long time.

6 Claims, 2 Drawing Sheets

FLEXIBLE HOSE JOINT

BACKGROUND OF THE INVENTION

1. Field of the Invention

The present invention relates to a joint for coupling flexible hoses made of a rubber material or a resin material such as nylon, polyurethane and having a comparatively small diameter of about less than 20 m/m used for establishing an oil or gas supply passage in automobiles or various kinds of outdoor machines and equipment.

2. Description of the Prior Art

Conventionally, the above type of joint has been constructed such that, as disclosed in Japanese Utility Model Publication No.61-24787, the outer peripheral portion of a hose is clamped by the top end of a collet or as disclosed in Japanese Laid-Open Patent Publication No.58-81293 or Japanese Utility Model Publication No. H3-14628, a platelike stop member or an antislippage ring having many notches formed on the inner and outer peripheral edges thereof in an alternative fashion is used to clamp the outer periphery of a hose by biting.

However, such conventional joint has been constructed mainly for coupling hoses laid within a factory, building or the like so that it has not always been provided with two means of which one is for sealing the outer peripheral surface of each hose within the joint and the other is for sealing that surface of the hose outside the joint by means of a collet or release ring. Further, the sealing means has been provided internally of the biting means so that when the hose is inserted into, or removed from, the joint, the scratched portion of the outer peripheral surface of the hose resulting from the use of the biting means has also been sealed by the sealing means. Further, where the joint is used for laying hoses in an automobile or outdoor machines and equipment, the entry of rain water, car washing water, mud or dust into the joint becomes inevitable which results in that the collet, release ring or stop member becomes corroded or defective and the sealing property of the joint is reduced to make the function of the joint inactive and the problem of leakage takes place.

SUMMARY OF THE INVENTION

The present invention has been made to solve the above-described problems and an object of the invention is to provide a flexible hose joint which is capable of preventing the formation of scratches on the sealed portion of the hose, preventing the entry thereinto of rain water, car washing water, mud or dust and maintaining the sealing function thereof stably and securely for a prolonged period of time by preventing the possible corrosion of the joint elements and other nonconformities within the joint.

In order to achieve the above-described object, the flexible hose joint according to the present invention comprises essentially a joint body having a hose-receiving cylindrical opening which extends in the axial direction thereof and which includes a radially enlarged section formed near the end of the joint body, clamp means incorporated thereinto with its top end held in the radially enlarged section of the hose receiving opening, a cover member having a hose insert hole in the direction of the axis thereof and adapted to fit about the outer wall of the radially enlarged cylindrical section so as to move axially within a certain distance range with respect to the latter, first annular sealing means interposed between the joint body and the cover member and second annular sealing means interposed between the inner wall of the hose insert hole and the outer peripheral surface of the hose. Further, the joint may additionally and optionally comprises means for urging the cover member to leave away from the joint body, means for locking the cover member and the joint body such as a snap fit or a snap ring, third annular sealing means provided in the inner wall of the radially enlarged cylindrical section so as to seal the outer peripheral portion of the top end of the hose inserted into the radially enlarged cylindrical section, a small-sized cylindrical member fitted into the radially enlarged cylindrical section in the joint body to control the flexing of the top end of the hose inserted in the joint body. Moreover, the above-mentioned clamp means may comprise a collet having its outer peripheral edge of the top end thereof abutting against the tapered inner wall surface continuous with the inner wall of the radially enlarged section on one hand and with the inner peripheral surface of the contracted opening at the rear of the joint body on the other, or a clamp member in the form of a platelike ring inserted into the hollow cylindrical section of the joint body so as to allow the inner peripheral edge of the top end thereof to bit the outer periphery of the end portion of the hose inserted into the joint body. Further, in order to re-release the biting of the collet or the clamp member in the hose, the joint may include a release member having a taper top end to engage the biting end of the collet. This release member may be formed integral with, or separately from, the cover member.

With the above structure, the interior of the joint can be completely sealed with the first and second sealing means at portions of the hose other than those where scratches are formed due to the use of the clamp means, so that even when the joint is applied on hoses in an automobile or outdoor machines and equipment, the entry into the joint of rain water, car washing water, mud or dust can be completely prevented and the sealing function of the joint can be stably and securely maintained for a prolonged period of time without the fear of corrosion of the coupled hoses within the joint or of the occurrence of nonconformities with respect to the joint.

DETAILED DESCRIPTION OF PREFERRED EMBODIMENTS

Figure 1:
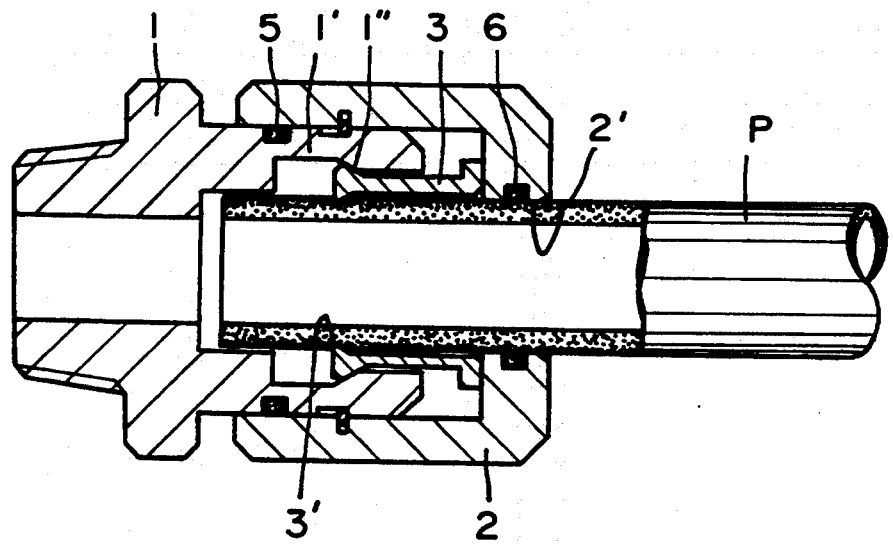
FIG. 1 is a vertical sectional view (partially cut away) of a flexible hose coupling joint as a first embodiment of the present invention, especially when it is applied to one of flexible hoses to be coupled together.
Figure 2:
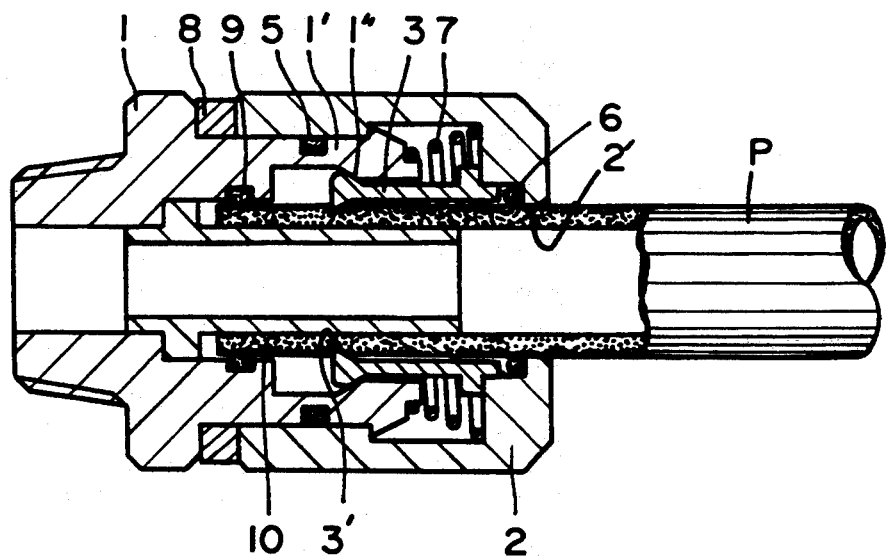
FIG. 2 is a vertical sectional view (partially cut away) of a flexible hose coupling joint as a second embodiment of the present invention especially when it is in the same state as in FIG. 1.
Figure 3:
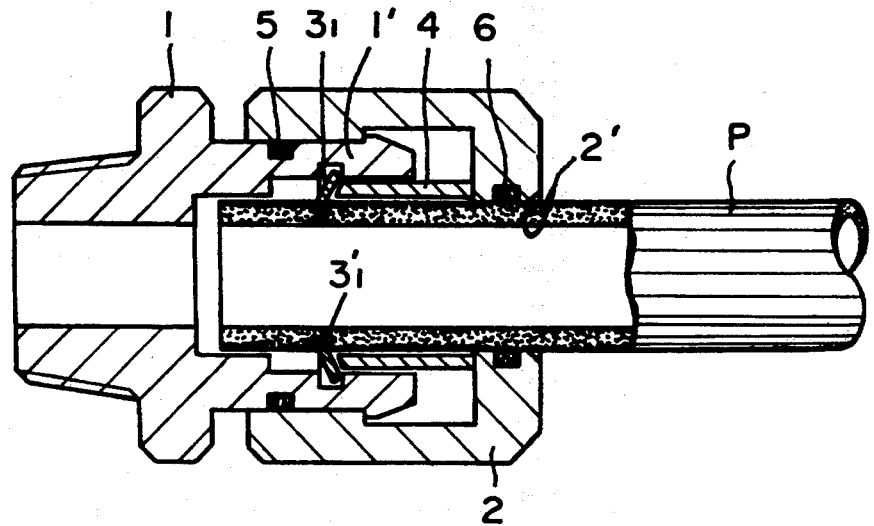
FIG. 3 is a vertical sectional view (partially cut away) of a flexible hose coupling joint as a third embodiment of the present invention especially when it is in the same state as in FIG. 1.
Figure 4:
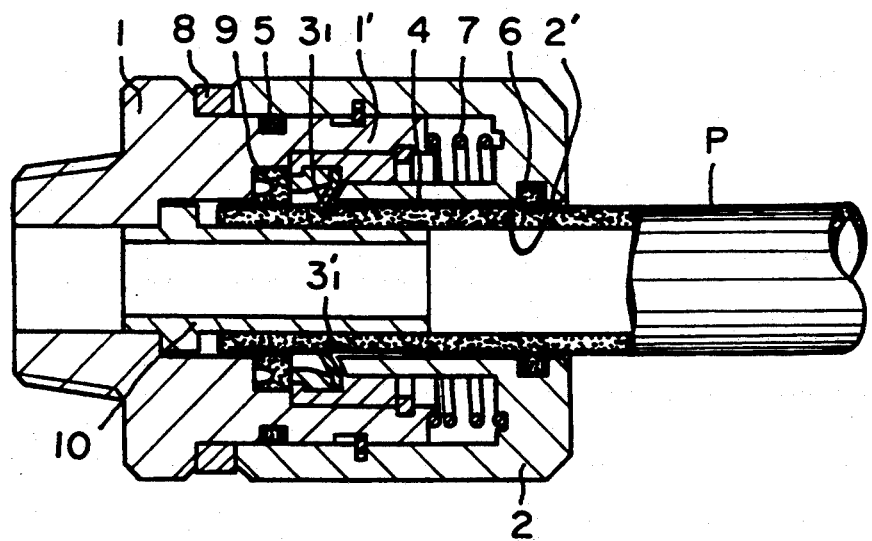
FIG. 4 is a vertical sectional view (partially cut away) of a flexible hose coupling joint as a fourth embodiment of the present invention especially when it is in the same state as in FIG. 1.

Preferred embodiments of the present invention will now be described with reference to the accompanying drawings. As shown in the drawings, reference numeral 1 designates a joint body which includes therein a radially enlarged cylindrical wall 1' having a tapered inner peripheral surface 1" continuous with the inner wall surface of a contracted opening or port at the rear end of the joint body as shown in FIGS. 1 and 2 or includes therein a cylindrical wall 1' of an enlarged diameter formed at the rear end thereof as shown in FIGS. 3 and 4. Reference numeral 3 designates a metallic collet as a clamp means with the inner peripheral edge of the top end thereof serving as a biting section 3' which abuts against the tapered inner wall surface 1" of the radially enlarged cylindrical section of the joint opening and bites a hose P inserted into the joint body as shown in FIGS. 1 and 2. Reference numeral 2 designates a cover member 2 having a hose insert hole 2' at the center thereof and capable of fitting about the outer wall of the joint body at a position corresponding to the radially enlarged cylindrical section so as to move in the axial direction within a certain distance range, relative to the joint body.

As regards the above-mentioned clamp means (i.e., the collet), it is possible to replace it with a platelike or washerlike ring $3_1$ whose inner peripheral edge acts as a hose biting section $3_1'$ within the joint body. Further, in order to release the biting of the clamp means $3_1'$ with respect to a hose inserted into the joint body, a release member 4 having a tapered top end may be incorporated into the joint body 1. This release member 4 may be formed integral with the cover member 2 (see FIG. 4) or separately therefrom (see FIG. 3).

Figure 5:
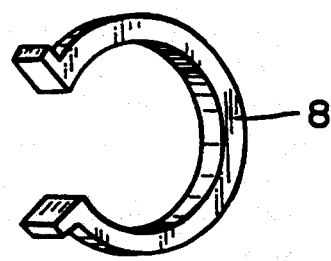
FIG. 5 is a perspective view of locking means in the form of a single body.

Reference numeral 5 designates first sealing means in the form of an elastic O-ring which is inserted between the joint body 1 and the cover member 2 and reference numeral 6 designates second seal means fitted in the cover member 2 so as to seal the outer peripheral surface of the hose P inserted into the joint body. Reference numeral 7 designates spring means for urging the cover member 2 to move away from the joint body 1 and reference numeral 8 designates segmental locking means in the form shown in FIG. 5 which restrains the movement of the cover member 2 with respect to the joint body 1 (see FIGS. 2 and 4) and releases the restraint of the cover member 2 when the hose P is removed from the joint body 1. Further, reference numeral 9 designates third sealing means fitted in the inner wall of the radially enlarged cylindrical section 1' so as to seal the outer peripheral surface of the top end of the hose P as shown in FIGS. 2 and 4, to thereby enhance the reliability of the sealing property of the joint. Lastly, reference numeral 10 designates a small-sized cylindrical member to be inserted into the radially enlarged cylinsection of the joint body 1 as shown in FIGS. 2 and 4. This cylindrical member is used for regulating the flexing of the hose P at its assembled portion thereby further stabilizing and securing the hose coupling function of the joint.

As described above, the flexible hose joint according to the present invention has various advantages that since the interior of the joint is completely sealed by the first and second sealing means and moreover, since the sealing means are not applied to the scratched portions of the inserted hose resulting from the biting by the collet and washerlike ring, the entry into the joint body of rain water, car washing water mud or dust can be prevented even the joint is used for the air or oil supply system of an automobile or other outdoor machines and equipment so that the corrosion of the hose and other nonconformities within the joint can be eliminated to thereby maintain the sealing function of the joint stably and securely for a prolonged period of time.

What is claimed is:

1. A flexible hose joint for a flexible hose having an end and an outer surface, said joint comprising:
   a joint body having opposed front and rear parts, a cylindrical opening extending in an axial direction between said front and rear parts, said cylindrical opening being radially enlarged at the rear part of the joint body for receiving the end of the hose;
   a clamp disposed in said radial enlarged section of said joint body and having a biting section for engagement with the outer surface of the hose;
   a cover member having a generally tubular side wall with opposed front and rear ends, said front end being disposed over the rear part of said joint body and being dimensioned to move axially in a certain distance range with respect to the joint body, a rear wall extending inwardly from said rear end of said side wall, said rear wall having a hose insert hole at the center thereof, said hose insert hole being dimensioned to slidably receive said end of said flexible hose therein, a release member integral with said rear wall and projecting forwardly toward said clamp, said release member having a tapered front end for urging said clamp out of biting engagement with said hose in response to the axial movement of said cover member relative to said joint body;
   a first annular seal interposed between the cover member and the joint body;
   a second annular seal in the cover member adjacent the hose insert hole of said cover member so as to seal the outer periphery of said hose and wherein there is further provided locking means to lock said cover member with respect to said joint body.

2. A flexible hose joint according to claim 1 further comprising biasing means for urging said cover away from said joint body, said biasing means being interposed between said joint body and said cover member.

3. A flexible hose joint according to claim 1, wherein a third annular seal is provided in the radially enlarged section of the cylindrical opening of said joint body so as to seal the outer surface of said hose adjacent said end thereof.

4. A flexible hose joint according to claim 1 wherein a cylindrical body is coaxially inserted into said radially enlarged section of said cylindrical opening within said joint body, said cylindrical body being dimensioned for slidable insertion into the end of the hose.

5. A flexible hose joint according to claim 1, wherein said clamp means comprises a collet operating such that the inner peripheral edge of the top end thereof bites the outer peripheral surface of the portion of said hose inserted within the joint body while the outer peripheral edge thereof abuts against a tapered inner wall surface of said cylindrical opening adjacent the inner wall surface of said radially enlarged section.

6. A flexible hose joint according to claim 1, wherein said clamp means comprises a platelike ring disposed within said radially enlarged section in said joint body so that the inner peripheral edge of the top end thereof bites the outer periphery of the portion of said hose inserted into said joint body.

* * * * *